(12) United States Patent
Kong et al.

(10) Patent No.: US 9,181,997 B2
(45) Date of Patent: Nov. 10, 2015

(54) CALIPER BRAKE

(71) Applicant: MANDO CORPORATION, Pyeongtaek-si, Gyeonggi-do (KR)

(72) Inventors: Young Hun Kong, Gunpo-si (KR); Seon Ki Hong, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 240 days.

(21) Appl. No.: 13/901,471

(22) Filed: May 23, 2013

(65) Prior Publication Data
US 2014/0020990 A1    Jan. 23, 2014

(30) Foreign Application Priority Data
Jul. 20, 2012  (KR) .................... 10-2012-0079373

(51) Int. Cl.
| | | |
|---|---|---|
| F16D 65/00 | (2006.01) | |
| F16D 55/226 | (2006.01) | |
| F16D 65/18 | (2006.01) | |
| F16D 65/56 | (2006.01) | |
| F16D 121/02 | (2012.01) | |
| F16D 121/04 | (2012.01) | |

(52) U.S. Cl.
CPC .......... *F16D 55/226* (2013.01); *F16D 65/0075* (2013.01); *F16D 65/18* (2013.01); *F16D 65/567* (2013.01); *F16D 2121/02* (2013.01); *F16D 2121/04* (2013.01)

(58) Field of Classification Search
CPC ............ F16D 2121/02; F16D 2121/04; F16D 2121/06; F16D 65/0075; F16D 65/567; F16D 65/568; F16D 66/02
USPC ...................................... 188/71.7, 72.1–72.9
See application file for complete search history.

(56) References Cited

U.S. PATENT DOCUMENTS

| | | | | | |
|---|---|---|---|---|---|
| 5,009,292 | A | * | 4/1991 | Hoffman et al. ............. | 188/71.7 |
| 6,651,784 | B1 | * | 11/2003 | Barbosa et al. ............. | 188/71.9 |
| 8,973,718 | B2 | * | 3/2015 | Kong et al. .................. | 188/72.8 |
| 2005/0145448 | A1 | * | 7/2005 | Watanabe et al. ........... | 188/72.1 |
| 2009/0107777 | A1 | * | 4/2009 | Kim ............................. | 188/72.7 |
| 2011/0278106 | A1 | * | 11/2011 | Kim ............................. | 188/72.1 |

* cited by examiner

*Primary Examiner* — Vishal Sahni
(74) *Attorney, Agent, or Firm* — McDermott Will & Emery LLP

(57) ABSTRACT

Provided is a caliper brake including a caliper housing that constitutes an exterior of the caliper brake and has one end on which a fork is formed and is bent, a brake cylinder that is mounted on a side of the caliper housing to face the fork and generates a brake force inside the brake cylinder using an oil pressure of a damping oil transmitted from a brake line, a piston that is mounted within the brake cylinder and pressurizes a brake disc between the piston and the fork using the brake force, a pressurization rod part that is mounted within the piston on a common axis, extends in an axial direction when abrasion occurs in the fork and a frictional pad of the piston so as to compensate for abrasion, and a return spring part.

10 Claims, 6 Drawing Sheets

CALIPER BRAKE

CROSS-REFERENCE TO RELATED PATENT APPLICATION

This application claims the benefit of Korean Patent Application No. 10-2012-0079373, filed on Jul. 20, 2012 in the Korean Intellectual Property Office, the disclosure of which is incorporated herein in its entirety by reference.

BACKGROUND OF THE INVENTION

1. Field of the Invention

The present invention relates to a caliper brake, and more particularly, a caliper brake in which a return spring that allows a piston performing brake within a brake cylinder to be returned to its original position when a brake pressure is released, is modularized with a pressurization rod part that pressurizes the piston so that a spring cage that fixes the return spring to the pressurization rod part can be conveniently and stably assembled.

2. Description of the Related Art

In general, caliper-type brakes are brakes that perform a brake operation by pressurizing and stopping a brake disc interposed between a piston and a frictional pad of a fork with a brake force applied to the piston, wherein a rotatative force of a brake lever that rotates by a parking cable during the brake operation is switched to a straight motion, thus generating the brake force of the piston.

In this case, caliper brakes can be classified in various manners according to a method of switching a rotatative motion of the brake lever to the straight motion. Thus, representative examples thereof may be ball in ramp (BIR) type caliper brakes. Caliper parking brakes, in particular, among them, as indicated by reference numeral 101 of FIG. 1, when a parking cable is pulled during parking brake, if a brake lever 100 connected to the parking cable is rotated, an input ramp 103 that is mounted in a cylinder 105 so as to rotate in synchronization with a rotation axis of the brake lever 100, is rotated.

As a result, when an uneven surface processed at a front side of the input ramp 103 and an uneven surface of an output ramp 107 that is matched to the uneven surface of the input ramp 103 in a state in which a ramp roller is interposed between the input ramp 103 and the output ramp 107, shake in a straight line direction due to rotation of the input ramp 103, the output ramp 107 makes a straight motion in an axial direction. Thus, a rotatative force that is introduced into the caliper parking brake 101 via the brake lever 100 is switched to the straight motion of the output ramp 107 and is used to pressurize a piston 109 mounted on a front end of the cylinder 105 forward. A brake disc 110 is pressurized between the piston 109 pressurized in this manner and a fork 111 via frictional pads 113, thus performing brake.

As described above, in the caliper parking brake 101 according to the related art, a recoil spring 115 is interposed between the output ramp 107 and the piston 109, as illustrated in FIG. 1. The recoil spring 115 inserted into a circumference of the output ramp 107 allows the output ramp 107 that pressurizes the piston 109 during brake to be returned to its original position when brake is released.

In this case, the recoil spring 115 is confined by a spring cage 121 having a tripod shape. To this end, the spring cage 121 includes a plurality of footpad parts 123 that constitute sidewalls of a body and are spaced apart from each other by a predetermined distance. Thus, hanging holes 125 are open to rear ends of the plurality of footpad parts 123 and thus are coupled to a plurality of hanging protrusions 117 that protrude from an outer circumferential surface of the output ramp 107 in a radial direction. Thus, the recoil spring 115 is fixed between the output ramp 107 and the piston 109.

Meanwhile, in the caliper parking brake 101 according to the related art, the hanging holes 125 should be hung in the hanging protrusions 117 so as to fix the recoil spring 115 inserted into the output ramp 107 using the tripod-shaped spring cage 121. To this end, the spring cage 121 has elasticity so that rear ends of the footpad parts 123, diameters of which are enlarged to the outside, can be further widened in the radial direction. Thus, the entire thickness of the footpad parts 123 cannot increase. As a result, the strength of the footpad parts 123 is deteriorated and thus the footpad parts 123 are easily deformed, which results in lowered durability and coupling force of the spring cage 121 and reduction in an usable life-span of the spring cage 121.

In contrast, when the entire thickness of the footpad parts 123 increases, elasticity of the footpad parts 123 is lost, and the spring cage 121 cannot be coupled to the output ramp 107 in a snap manner. Thus, assembling and manufacturing efficiency may be lowered like when assembling becomes difficult.

Also, since a direction in which force is applied to the spring cage 121 by the recoil spring 115 and a direction in which the spring cage 121 is prevented from escaping from the output ramp 107 via the hanging holes 125 and the hanging protrusions 117 coincide with each other in an axial line direction, even when coupling of the hanging holes 125 and the hanging protrusions 117 is not slightly complete, the spring cage 121 escapes from the output ramp 107 easily. Thus, reliability of assembling is lowered, and an assembling defect occurs comparatively easily.

SUMMARY OF THE INVENTION

The present invention provides a caliper brake in which the shape or structure of a spring cage module that fixes a return spring that allows a piston to be returned to its original position when brake is released to a pressurization rod part, is optimized so that work for fixing the return spring to the pressurization rod part using the spring cage can be conveniently performed by one touch and stability of assembling of the spring cage and the pressurization rod part or durability of the spring cage can be further improved.

According to an aspect of the present invention, there is provided a caliper brake including: a caliper housing that constitutes an exterior of the caliper brake and has one end on which a fork is formed and is bent; a brake cylinder that is mounted on a side of the caliper housing to face the fork and generates a brake force inside the brake cylinder using an oil pressure of a damping oil transmitted from a brake line; a piston that is mounted within the brake cylinder and pressurizes a brake disc between the piston and the fork using the brake force generated in the brake cylinder during brake so as to perform brake; a pressurization rod part that is mounted within the piston on a common axis, extends in an axial direction when abrasion occurs in the fork and a frictional pad of the piston and increases a distance at which the piston pressurizes the brake disc and moves, so as to compensate for abrasion; and a return spring part that is disposed within the brake cylinder on a common axis to the pressurization rod part, is elastically compressed during brake, is elastically restored when brake is released such that the abrasion compensation rod part is returned to its original position before brake.

The return spring part may include low-pressure and high-pressure springs that are arranged in parallel on a common axis, and when a brake force generated in the brake cylinder is small, the low-pressure spring may be compressed, when the brake force is large, the low-pressure and high-pressure springs may be compressed, and when brake is released, the piston may be returned to a position before brake by an elastic repulsive force of the low-pressure spring or elastic repulsive forces of the low-pressure and high-pressure springs.

The pressurization rod part may include: a return pipe that elastically compresses the return spring part and moves forward when the return pipe is pressurized by the brake force within the brake cylinder and is returned to a state before pressurization by a repulsive force of the return spring part when the brake force is released; an adjustment rod that is one-direction screw coupled to a front end of the return pipe so as to move relative to the return pipe only in an extension direction, if, as the piston moves forward, a gap between a front end surface of the adjustment rod and an inner circumferential surface of the piston is generated, moves forward from the return pipe by the gap; and an abrasion compensation spring, a rear end of which is hung in the inner circumferential surface of the piston, a front end of which is hung in the adjustment rod so as to elastically support the adjustment rod with respect to the piston such that a front end of the adjustment rod is closely adhered to the inner circumferential surface of the piston.

The return spring part may include: a spring cage that constitutes an exterior of the return spring part and is inserted into and fixed to an outer circumference of the return pipe on a common axis; the low-pressure spring that is mounted on a common axis to the return pipe so as to be interposed between a flange of the return pipe and a bottom surface of the spring cage; and the high-pressure spring that is inserted into a circumference of the low-pressure spring on a common axis, is mounted between the flange and the spring cage and is configured in such a way that the flange compresses the low-pressure spring, moves forward by a gap and then pressurization starts being performed by the flange.

The caliper brake may further include a support plate that is coupled to the flange of the return pipe, supports a rear end of the high-pressure spring and allows the flange that compresses the low-pressure spring and moves forward by the gap to contact the rear end of the high-pressure spring.

The return pipe may have a rear end on which the flange is formed, and a plurality of slots that are cut out in a radial direction in the flange may be arranged along an outer circumference of the return pipe at regular intervals, and a plurality of mounting protrusion parts may be arranged along the outer circumference of the return pipe at regular intervals so as to be inserted into the plurality of slots and protrude from the flange forward by a gap and are in contact with the rear end of the high-pressure spring.

The spring cage may be formed as a shape of a hanging hook in which sidewalls of the hanging hook-shaped body extend in a lengthwise direction, are bent in a circumferential direction, are hung in rear sides of the mounting protrusion parts and thus support the low-pressure and high-pressure springs.

The hanging hook may be configured in such a way that hanging protrusions protrude from front ends of the bent part so that the hanging protrusions are hung in rear edges of the mounting protrusion parts in a state in which the bent part is hung in the rear sides of the mounting protrusion parts, thus preventing rotation of the hanging hook in a circumferential direction.

Finishing protrusions of the mounting protrusion parts of the support plate may protrude from radial outer sides than a position in which the hanging hook is hung, thus preventing the hanging hook from escaping from a radial direction of the support plate.

The finishing protrusions may protrude toward an inner circumferential surface of the caliper housing so that a distance between the finishing protrusions and the inner circumferential surface of the brake cylinder that faces the finishing protrusions when assembling is less than a thickness of the hanging hook.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a caliper brake according to the present invention will now be described more fully with reference to the accompanying drawings, in which an exemplary embodiment of the invention is shown.

Figure 1:
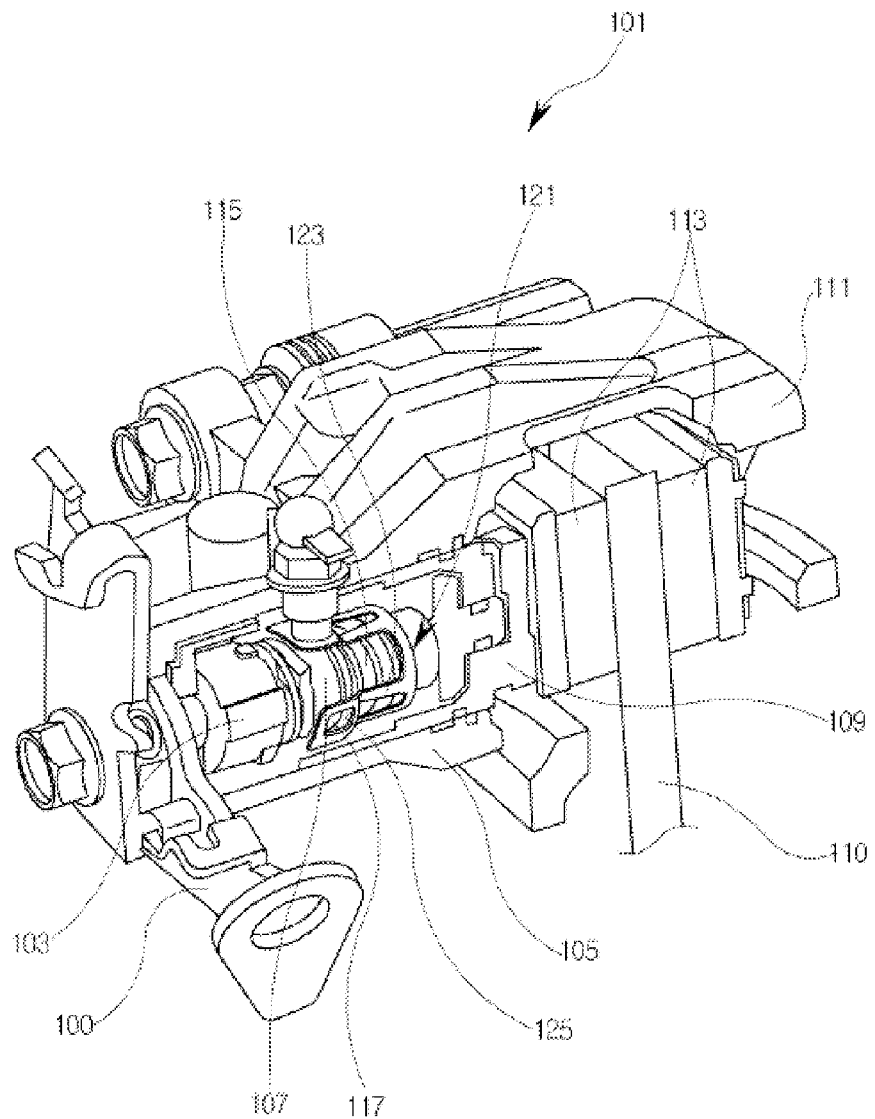
FIG. 1 is a partial cross-sectional perspective view illustrating a caliper parking brake including a spring cage according to the related art.
Figure 2:
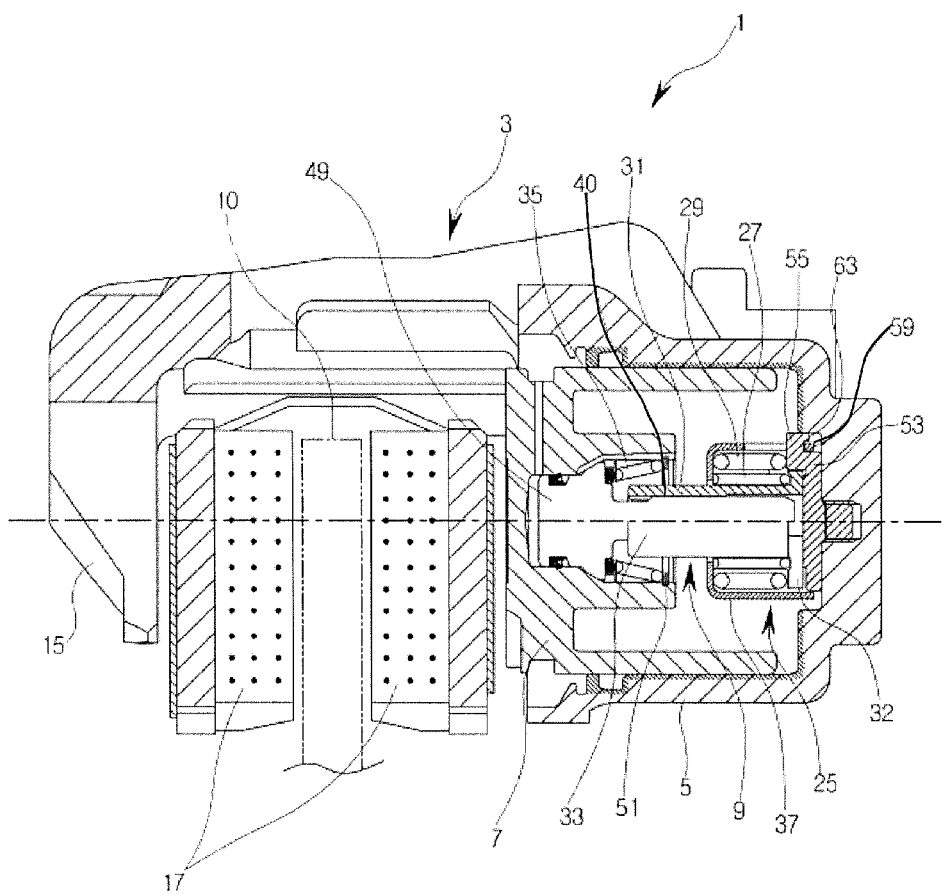
FIG. 2 is a longitudinal cross-sectional view of a caliper brake according to an embodiment of the present invention.
Figure 3:
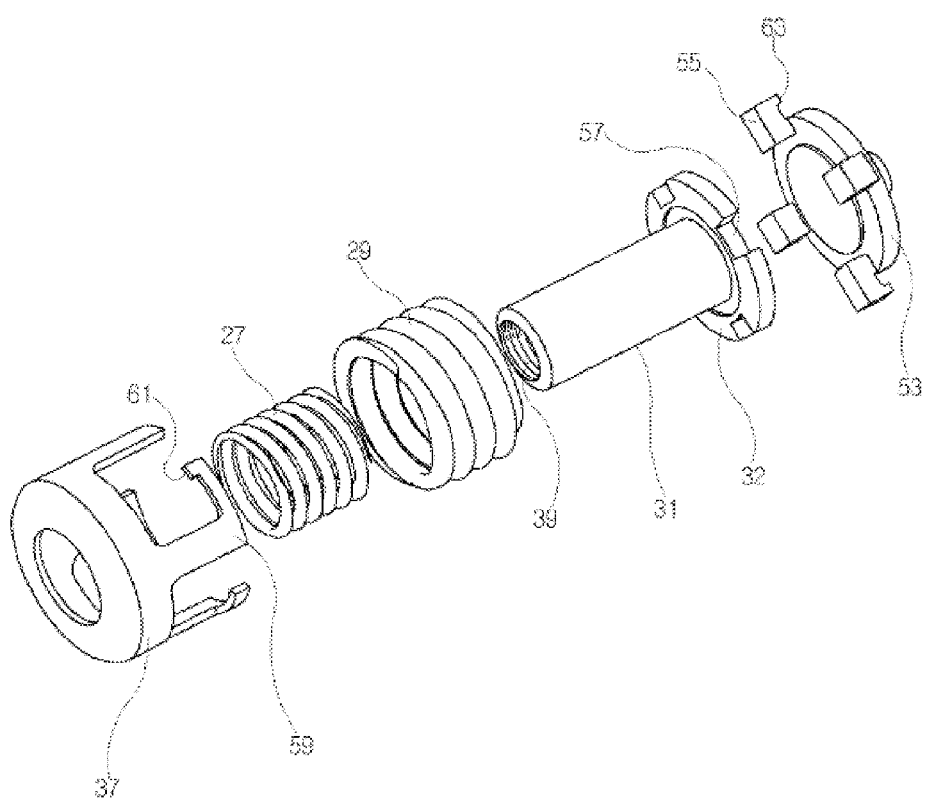
FIG. 3 is an exploded perspective view of a return spring part illustrated in FIG. 2.
Figure 4:
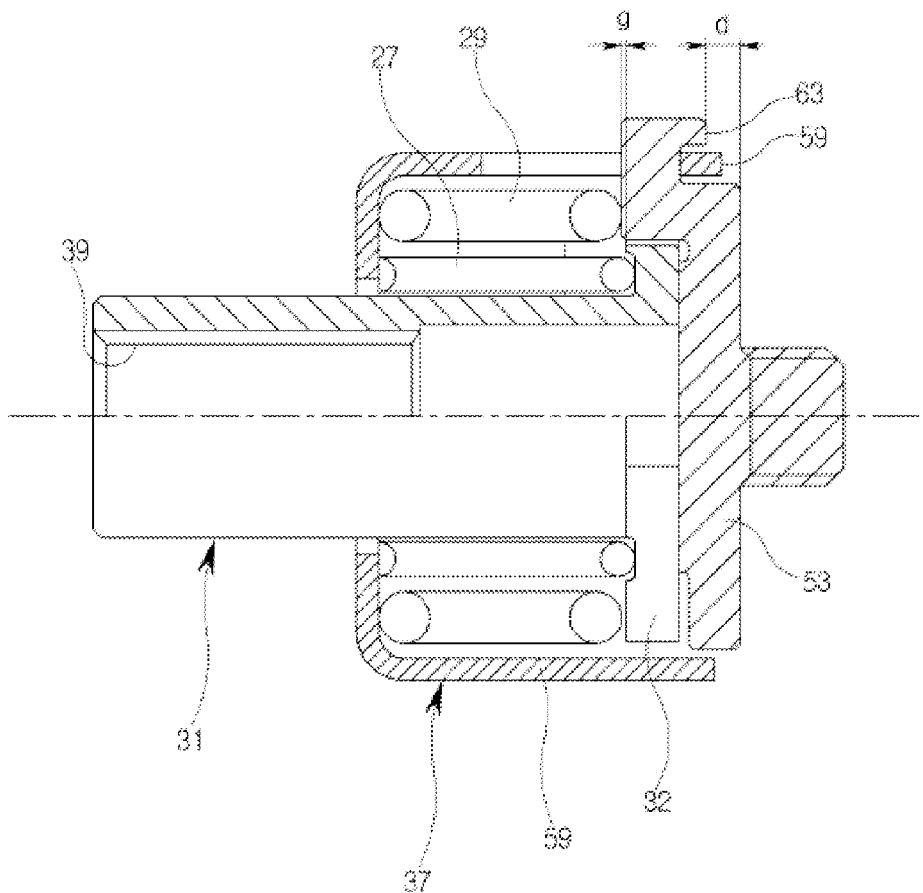
FIG. 4 is an enlarged longitudinal cross-sectional view of the return spring part of FIG. 2.
Figure 5:
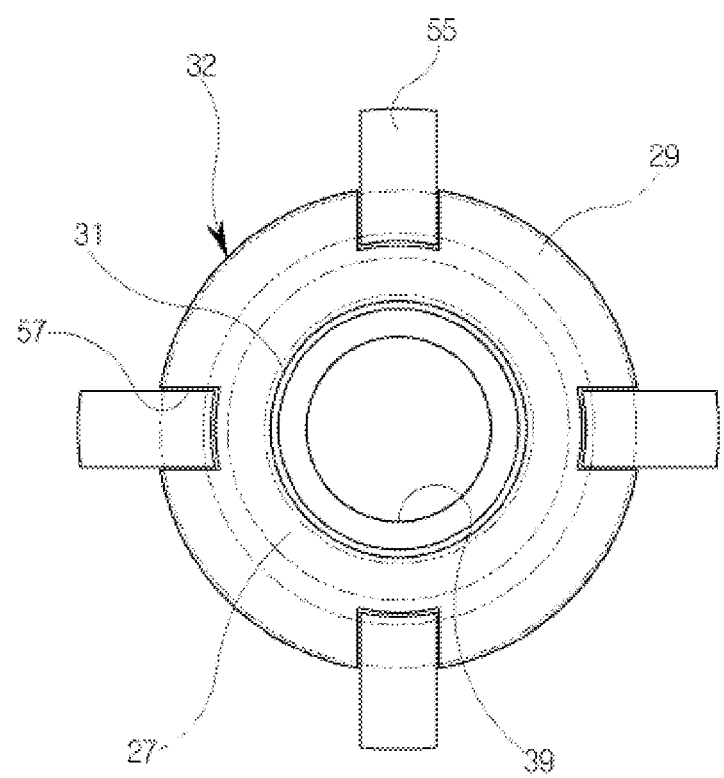
FIG. 5 is a plan view of FIG. 4.
Figure 6:
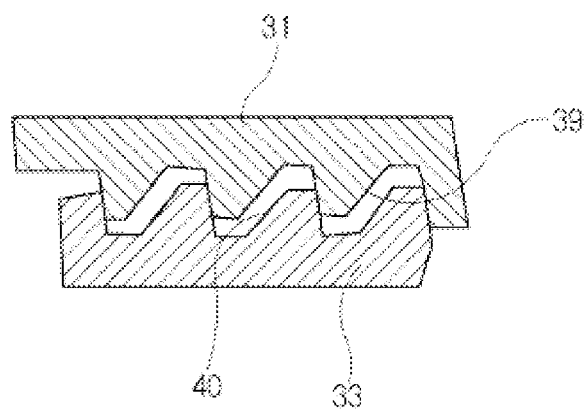
FIG. 6 is an enlarged view for illustrating one-direction screw coupling of a return pipe and an adjustment rod illustrated in FIG. 2.

FIG. 2 is a longitudinal cross-sectional view of a caliper brake according to an embodiment of the present invention, FIG. 3 is an exploded perspective view of a return spring part illustrated in FIG. 2, FIG. 4 is an enlarged longitudinal cross-sectional view of the return spring part of FIG. 2, FIG. 5 is a plan view of FIG. 4, and FIG. 6 is an enlarged view for illustrating one-direction screw coupling of a return pipe and an adjustment rod illustrated in FIG. 2.

Referring to FIG. 2, a caliper brake 1 according to the current embodiment of the present invention includes a caliper housing 3, a brake cylinder 5, a piston 7, a pressurization rod part 9, and a return spring part 25.

Here, the caliper housing 3 constitutes the exterior of the caliper brake 1 and includes a fork 15 that is formed on a front end of the caliper housing 3, pressurizes a brake disc 10 together with the piston 7 and is bent in an orthogonal direction, and the brake cylinder 5 that is formed on a rear end of the caliper housing 3 that faces the fork 15, as illustrated in FIG. 2.

The brake cylinder 5 is a portion where a brake force is generated by an oil pressure of a damping oil supplied from a master cylinder. As illustrated in FIG. 2, the brake cylinder 5 is disposed on the rear end of the caliper housing 3 to face the fork 15 and thus constitutes the brake force inside the brake cylinder 5 by the damping oil that flows through a brake line connected to the master cylinder.

The piston 7 is a portion where brake is performed while making a reciprocating motion forward and backward within the brake cylinder 5. As illustrated in FIG. 2, the piston 7 is mounted on a front end of the brake cylinder 5 so as to slide along an inner circumferential surface of the brake cylinder 5. Thus, when the damping oil is supplied into the brake cylinder, i.e., when a brake pedal operates, the piston 21 makes a straight motion by a brake force generated in the brake cylinder 5 and pressurizes and grips the brake disc 10 against the fork 15, thus performing brake.

The pressurization rod part 9 is a unit for compensating for abrasion that occurs in frictional pads 17 that are respectively attached to brake surfaces of the fork 15 and the piston 7. The pressurization rod part 9 is mounted within the piston 7 on a common axis. Thus, when abrasion occurs in the frictional pads 17, the pressurization rod part 9 is extended in the axial direction so that a distance at which the piston 7 moves while pressurizing the brake disc 10, increases.

To this end, the pressurization rod part 9 includes a return pipe 31 that is mounted on a support plate 59 fixed to inner walls of the brake cylinder 5, an adjustment rod 33 that is screw coupled to an inside of the return pipe 31, and an abrasion compensation spring 35 that is mounted between the adjustment rod 33 and an inner circumferential surface of the piston 7, as illustrated in FIG. 2 and part of FIG. 3.

Here, the return pipe 31 is a cylindrical pipe body in which a flange 32 protrudes from a rear end of the return pipe 31 in a radial direction, and a female screw part 39 is processed on a front end of an inner circumferential surface of the return pipe 31, as illustrated in FIGS. 2 and 3. Thus, each screw thread of the female screw part 39 has a right-angled triangle cross-section, thus allowing a male screw part 40 of the adjustment rod 33 to rotate relative to the female screw part 39 in a direction in which the male screw part 40 moves forward but preventing the male screw part 40 of the adjustment rod 33 from rotating relative to the female screw part 39 in a direction in which the male screw part 40 retreats, as illustrated in FIG. 6. Thus, the return pipe 31 moves forward together with the adjustment rod 33 along the piston 7 that moves forward when the brake pressure is established in the brake cylinder 5 and elastically compresses the return spring part 25. Meanwhile, when the brake pressure in the brake cylinder 5 dissipates, the return pipe 31 retreats by a repulsive force of the return spring part 25 and thus is returned to a state before brake.

Also, the adjustment rod 33 is a rod body that is coupled to a front end of the return pipe 31 so as to be movable relative to the return pipe 31. The adjustment rod 33 includes a rod body that is coupled to the return pipe 31 and a hydraulic head 49 that is disposed on a front end of the rod body and is enlarged in a radial direction, as illustrated in FIG. 2.

In this case, the male screw part 40 having a right-angled triangular screw thread is processed on an outer circumferential surface of the adjustment rod 33 and thus is screw coupled to the return pipe 31 in one direction, as illustrated in FIG. 6. Thus, the adjustment rod 33 is movable relative to the return pipe 31 only in a direction which the adjustment rod 33 extends forward, due to an interaction with the female screw part 39 of the return pipe 31. Thus, when the piston 7 moves forward, if a front end surface of the adjustment rod 33 is spaced apart from the inner circumferential surface of the piston 7 and thus a gap therebetween is generated, the adjustment rod 33 moves forward relative to the return pipe 31 by the gap such that the hydraulic head 49 is closely adhered to the inner circumferential surface of the piston 7. Thus, the entire length of the pressurization rod part 9 increases by movement of the adjustment rod 33, i.e., by a gap between the frictional pads 17 and the brake disc 10. As a result, the piston 7 and the frictional pads 17 pressurize the brake disc 10 without any gap, thus compensating for abrasion of the frictional pads 17.

Last, the abrasion compensation spring 35 is an elastic member that allows a front end of the adjustment rod 33 to be closely adhered to the inner circumferential surface of the piston 7. A rear end of the abrasion compensation spring 35 is supported in a mounting ring 51 inserted into the inner circumferential surface of the piston 7, and a front end of the abrasion compensation spring 35 is supported on a rear side of the hydraulic head 49 of the adjustment rod 33 such that the hydraulic head 49 of the adjustment rod 33 can be elastically supported with respect to the piston 7 that is closely adhered to a front side of the hydraulic head 49 of the adjustment rod 33.

In addition, the return spring part 25 is an elastic member that allows the piston 7 to be returned to its original position before brake when a brake force exerted on the brake cylinder 5 is released. As illustrated in FIGS. 2 and 3, the return spring part 25 is mounted in the brake cylinder 5 on a common axis to the pressurization rod part 9. Thus, the return spring part 25 is elastically compressed when the pressurization rod part 9 moves forward b the brake force established in the brake cylinder 5 during brake, in contrast, when the brake force established in the brake cylinder 5 is released, the return spring part 25 is elastically restored such that the pressurization rod part 9 is returned to a position before brake.

To this end, the return spring part 25 according to the present invention, in particular, as illustrated in FIGS. 2 and 3, includes low-pressure and high-pressure springs 27 and 29 that are inserted in a circumference of the return pipe 31 on a common axis and are arranged in parallel inside and outside the return pipe 31, and a spring cage 37 that surrounds the low-pressure and high-pressure springs 27 and 29. Thus, the low-pressure spring 27 starts being compressed prior to the high-pressure spring 29 when the brake pressure in the brake cylinder 5 is low, and the low-pressure and high-pressure springs 27 and 29 are simultaneously compressed when the brake pressure is high. Thus, when the low brake force is released, the piston 7 is returned to the position before brake by a restoring force of the low-pressure spring 27; however, when the high brake force is released, the piston 7 is returned to the position before brake by restoring forces of the low-pressure and high-pressure springs 27 and 29.

To this end, the spring cage 37 of the return spring part 25 constitutes the exterior of the return spring part 25 so as to surround the low-pressure and high-pressure springs 27 and 29, as illustrated in FIGS. 2 through 4. The spring cage 37 of the return spring part 25 is inserted into the circumference of the return pipe 31 on a common axis so as to fix the low-pressure and high-pressure springs 27 and 29 and thus is hung in and fixed to a support plate 53, for example.

Also, the low-pressure spring 27 is mounted on the circumference of the return pipe 31 on a common axis, is interposed between the flange 32 of the return pipe 31 and a bottom surface of the spring cage 37, thus applying an elastic force to the piston 7 in a direction in which forward movement of the return pipe 31 is prevented, as illustrated in FIGS. 2 through 4. The high-pressure spring 29 is also mounted on the circumference of the return pipe 31, i.e., a circumference of the low-pressure spring 27 on a common axis and applies an elastic force to the piston 7 in the direction in which forward movement of the return pipe 31 is prevented, as illustrated in FIGS. 2 through 4. Thus, as illustrated in FIG. 4, the high-pressure spring 29 is supported on the mounting protrusion part 55 of the support plate 53 between the spring cage 37 and the flange 32 in such a way that the flange 32 compresses the low-pressure spring 27, moves forward by a gap g indicated in FIG. 4 and then pressurization starts being performed by the flange 32.

In this way, the return spring part 25 according to the present invention further includes the support plate 53 so as to fix the spring cage 37 and to support the high-pressure spring 29. Thus, the support plate 53 is coupled to a rear side of the flange 32 of the return pipe 31 and supports a rear end of the high-pressure spring 29 in a state in which the support plate 53 protrudes from the flange 32 forward by the gap g, as illustrated in FIGS. 2 and 4. Thus, the flange 32 compresses the low-pressure spring 27 by the gap g in the state of FIG. 4 and moves forward and then contacts the rear end of the high-pressure spring 29.

To this end, the return pipe 31 is configured in such a way that a plurality of slots 57 that are cut out in a radial direction in the flange 32 formed on the rear end of the return pipe 31 are arranged along an outer circumference of the return pipe 31 at regular intervals, as illustrated in FIGS. 3 through 5. Also, a plurality of mounting protrusion parts 55 protrude from the support plate 53 coupled to a rear side of the return pipe 31 forward. Thus, the plurality of mounting protrusion parts 55 are arranged along the outer circumference of the return pipe 31 at regular intervals and are inserted into the plurality of slots 57 of the flange 31 and thus protrude from the flange 32 forward by the gap g and are in contact with the rear end of the high-pressure spring 29.

Meanwhile, the spring cage 37 is formed as an "L" shape hanging hook 59 in which sidewalls of the body extend in a lengthwise direction and are bent in a circumferential direction, as illustrated in FIG. 3. The hanging hook 59 is hung in rear sides of the mounting protrusion parts 55 and thus supports the low-pressure and high-pressure springs 27 and 29, as illustrated in FIGS. 2 and 4. To this end, the hanging hook 59 is configured to allow the mounting protrusion parts 55 to pass through a space between the hanging hook 59 and an adjacent hanging hook 59 and then to rotate the mounting protrusion parts 55 around the axial line so that a bent part of the hanging hook 59 that extends in the circumferential direction is hung in the rear sides of the mounting protrusion parts 55, thus corresponding to the shape of the mounting protrusion parts 55 when the hanging hook 59 is inserted into the mounting protrusion parts 55.

In this case, the hanging hook 59 of the spring cage 37 is configured in such a way that hanging protrusions 61 protrude from front ends of the bent part so that the hanging protrusions 61 can be hung in rear edges of the mounting protrusion parts 55 in a state in which the bent part is hung in the rear sides of the mounting protrusion parts 55, thus preventing rotation of the hanging hook 59 in the circumferential direction and thus preventing the spring cage 36 from rotating in the circumferential direction, as illustrated in FIG. 3.

Also, finishing protrusions 63 of the mounting protrusion parts 55 of the support plate 53 protrude from radial outer sides than a position in which the bent part of the hanging hook 59 is hung, as illustrated in FIG. 4. Thus, the mounting protrusion parts 55 of the support plate 53 prevent the hanging hook 59 from escaping from the radial direction of the support plate 53 in a state in which the bent part of the hanging hook 59 that extends in the circumferential direction of the spring cage 37 is hung in the rear sides of the mounting protrusion parts 55.

Furthermore, the finishing protrusions 63 of the mounting protrusion parts 55 may protrude toward rear walls of the brake cylinder 5 so that, when the return spring part 25 is assembled in the brake cylinder 5, i.e., when the support plate 53 is coupled to the rear walls of the brake cylinder 5 by screw coupling, a distance d between the finishing protrusion 63 and an inner circumferential surface of the brake cylinder 5 is less than the thickness of the bent part of the hanging hook 59. In this case, even when the spring cage 37 is pushed backward in the state of FIG. 4 and the bent part of the hanging hook 59 is spaced apart from the rear sides of the mounting protrusion parts 55, since the thickness of the bent part is greater than the distance d between the finishing protrusion 63 and the inner circumferential surface of the brake cylinder 5, the bent part of the hanging hook 59 can be prevented from climbing over and escaping from the finishing protrusions 63.

Now, an operation of the caliper parking brake 1 having the above structure according to the present invention will be described as below.

If a driver steps on a brake pedal so as to perform brake, an oil pressure of a damping oil is established in the brake cylinder 5 of the caliper brake 1 via a brake line from a master cylinder. Thus, the piston 7 moves forward along the inner circumferential surface of the brake cylinder 5.

In this way, when the piston 7 moves forward, the brake disc 10 is pressurized between the piston 7 and the fork 15 by the frictional pads 17. In this case, the return spring part 25 compressed by the pressurization rod part 9 that moves forward together with the piston 7 operates according to the size of the brake force. That is, when the brake pressure established in the brake cylinder 5 is low, the brake force exerted on the piston 7 is reduced and thus not only the return pipe 31 and the adjustment rod 33 but also the abrasion compensation spring 35 do not move relative to the piston 7 and move forward together with the piston 7. Thus, first, the return pipe 31 compresses only the low-pressure spring 27 using the flange 32. Thus, even when the brake force dissipates, the pressurization rod part 9 is returned to its original position with a small force by the restoring force of the low-pressure spring 27. In this case, since the elastic repulsive force of the abrasion compensation spring 35 is greater than that of the low-pressure spring 27, the abrasion compensation spring 35 is not compressed but allows the pressurization rod part 9 to move forward, thus compressing the low-pressure spring 27.

In contrast, when the brake pressure established in the brake cylinder 5 is relatively large, the brake force exerted on the piston 7 increases. Thus, not only the low-pressure spring 27 but also the high-pressure spring 29 are compressed by the flange 32 of the return pipe 31 that moves forward together with the piston 7. In this case, the return pipe 31 simultaneously compresses not only the low-pressure spring 27 but also the high-pressure spring 29 that contacts the mounting protrusion parts 55 and is positioned forward by the gap g, using the flange 32. Thus, when the brake force dissipates, the pressurization rod part 9 is returned to its original position using a large force caused by restoring forces of the low-pressure and high-pressure springs 27 and 29. In this way, if the brake pressure established in the brake cylinder 5 is relatively large, pressure applied to the hydraulic head 49 of the adjustment rod 33 is relatively large and thus the pressurization rod part 9 is maintained in a state in which the hydraulic head 49 is closely adhered to the inner circumferential surface of the piston 7 and moves forward. Thus, as described above, the low-pressure and high-pressure springs 27 and 29 are simultaneously compressed by the flange 32 of the return pipe 31.

When a gap between the brake disc 10 and the frictional pads 17 is generated by abrasion of the frictional pads 17, if a brake pressure is established in the brake cylinder 5 via the brake line, the piston 7 moves forward together with the pressurization rod part 9 in a section of the gap g in which only the low-pressure spring 27 is compressed by the return pipe 31. However, when a resultant force of a compressed repulsive force of the abrasion compensation spring 35 and force applied to the hydraulic head 49 by the brake pressure is less than elastic repulsive forces of the low-pressure and high-pressure springs 27 and 29, only the piston 7 moves forward, and the pressurization rod part 9 is maintained in its current position. Thus, space between the inner circumferential surface of the piston 7 and a front side of the hydraulic head 49 is instantaneously spaced apart from each other. Thus, due to the resultant force of the compressed repulsive force of the abrasion compensation spring 35 and force applied to the hydraulic head 49 by the brake pressure, the hydraulic head 49, the front side of which is not confined any longer, moves forward relative to the piston 7 by one-direction screw transfer from the return pipe 31 until the hydraulic head 49 contacts the inner circumferential surface of the piston 7. Thus, the hydraulic head 49 is maintained in contact with the inner circumferential surface of the piston 7 in real-time. As a result, the pressurization rod part 23 is extended from the return pipe 31 to a length that increases by relative movement of the adjustment rod 33, thus compensating for abrasion of the frictional pads 17.

As described above, in a caliper brake according to the present invention, a spring cage that fixes a return spring part inserted into a pressurization rod part can be rotatably coupled to a mounting protrusion part of a support plate coupled to a rear end of the return spring part via a hanging hook that is bent in a "⌐"-shape so that a direction in which the return spring part repulses elastically and a direction in which the hanging hook is hung in the mounting protrusion part are perpendicular to each other and thus do not coincide with each other, even when coupling of the spring cage and the support plate is performed by one touch, stability of assembling of the spring cage and the support plate can be maintained at a very high level.

In addition, since the hanging hook of the spring cage hung in the mounting protrusion part of the support plate is not required to have elasticity for coupling of the spring cage and the support plate, a hanging part of the hanging hook can be relatively thick so that an assembling defect that occurs when the hanging hook is easily deformed or lowering of durability can be prevented in advance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A caliper brake comprising:
   a caliper housing that constitutes an exterior of the caliper brake and has one end on which a fork is formed and is bent;
   a brake cylinder that is mounted on a side of the caliper housing to face the fork and generates a brake force inside the brake cylinder using an oil pressure of a damping oil transmitted from a brake line;
   a piston that is mounted within the brake cylinder and pressurizes a brake disc between the piston and the fork using the brake force generated in the brake cylinder during braking;
   a pressurization rod part that is mounted within the piston on a common axis, extends in an axial direction when abrasion occurs in the fork and a frictional pad of the piston and increases a distance at which the piston pressurizes the brake disc and moves, to compensate for abrasion; and
   a return spring part that is disposed within the brake cylinder on the common axis to the pressurization rod part, is elastically compressed during brake, is elastically restored when brake is released such that the abrasion compensation rod part is returned to its original position before brake,
   wherein the return spring part includes:
   at least one return spring allowing the piston to return to its original position when the oil pressure is released; and
   a spring cage housing the at least one return spring engaged with the pressurization rod part in a rotating manner by an "L" shape hanging hook formed therein.

2. The caliper brake of claim 1, wherein the return spring part comprises low-pressure and high-pressure springs that are arranged in parallel on the common axis, and
   when a first brake force is generated in the brake cylinder, the low-pressure spring is compressed, when a second brake force which is larger than the first brake is generated, the low-pressure and high-pressure springs are compressed, and when brake is released, the piston is returned to a position before brake by an elastic repulsive force of the low-pressure spring or elastic repulsive forces of the low-pressure and high-pressure springs.

3. The caliper brake of claim 2, wherein the pressurization rod part comprises:
   a return pipe that elastically compresses the return spring part and moves forward when the return pipe is pressurized by the brake force within the brake cylinder and is returned to a state before pressurization by a repulsive force of the return spring part when the brake force is released;
   an adjustment rod that is one-direction screw coupled to a front end of the return pipe to move relative to the return pipe only in an extension direction, if, as the piston moves forward, a first gap between a front end surface of the adjustment rod and an inner circumferential surface of the piston is generated, moves forward from the return pipe by the first gap; and
   an abrasion compensation spring, a rear end of which is hung in the inner circumferential surface of the piston, a front end of which is hung in the adjustment rod to elastically support the adjustment rod with respect to the piston such that a front end of the adjustment rod is closely adhered to the inner circumferential surface of the piston.

4. The caliper brake of claim 3, wherein
   the spring cage constitutes an exterior of the return spring part and is inserted into and fixed to an outer circumference of the return pipe on the common axis, and
   the at least one return spring includes:
   the low-pressure spring that is mounted on the common axis to the return pipe to be interposed between a flange of the return pipe and a bottom surface of the spring cage; and
   the high-pressure spring that is inserted into a circumference of the low-pressure spring on the common axis, is mounted between the flange and the spring cage and is configured in such a way that the flange compresses the low-pressure spring, moves forward by a second gap and then pressurization starts being performed by the flange.

5. The caliper brake of claim 4, further comprising a support plate that is coupled to the flange of the return pipe, supports a rear end of the high-pressure spring and allows the flange that compresses the low-pressure spring and moves forward by the second gap to contact the rear end of the high-pressure spring.

6. The caliper brake of claim 5, wherein the return pipe has a rear end on which the flange is formed, and a plurality of slots that are cut out in a radial direction in the flange are arranged along an outer circumference of the return pipe at regular intervals, and a plurality of mounting protrusion parts are arranged along the outer circumference of the return pipe at regular intervals to be inserted into the plurality of slots and protrude from the flange forward by the second gap and are in contact with the rear end of the high-pressure spring.

7. The caliper brake of claim 6, wherein the hanging hook extends in a lengthwise direction, and then bent in a circumferential direction, thereby being engaged with rear sides of the mounting protrusion parts and thus supporting the low-pressure and high-pressure springs.

8. The caliper brake of claim 6, wherein the hanging hook includes hanging protrusions protruding from front ends of the bent portion of the hanging hook so that the hanging protrusions are hung in rear edges of the mounting protrusion parts in a state in which the bent portion is hung in the rear sides of the mounting protrusion parts, thus preventing rotation of the hanging hook in a circumferential direction.

9. The caliper brake of claim 7, wherein the mounting protrusion parts of the support plate has finishing protrusions protruding rearwards from radial outer sides of the finishing protrusions at a position in which the hanging hook is hung, thus preventing the hanging hook from escaping from a radial direction of the support plate.

10. The caliper brake of claim 9, wherein the finishing protrusions protrude toward an inner circumferential surface of the caliper housing so that a distance between the finishing protrusions and an inner circumferential surface of the brake cylinder that faces the finishing protrusions when assembling is less than a thickness of the hanging hook.

* * * * *